A. L. BLACKMAN.
Wheels for Vehicles.
No. 135,623.  Patented Feb. 11, 1873.
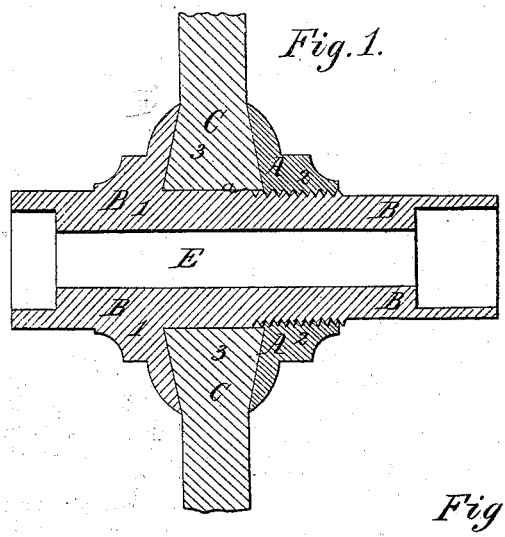
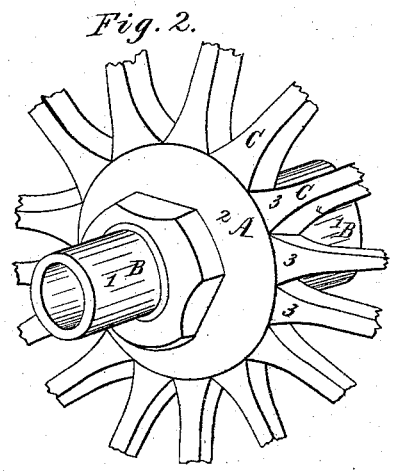
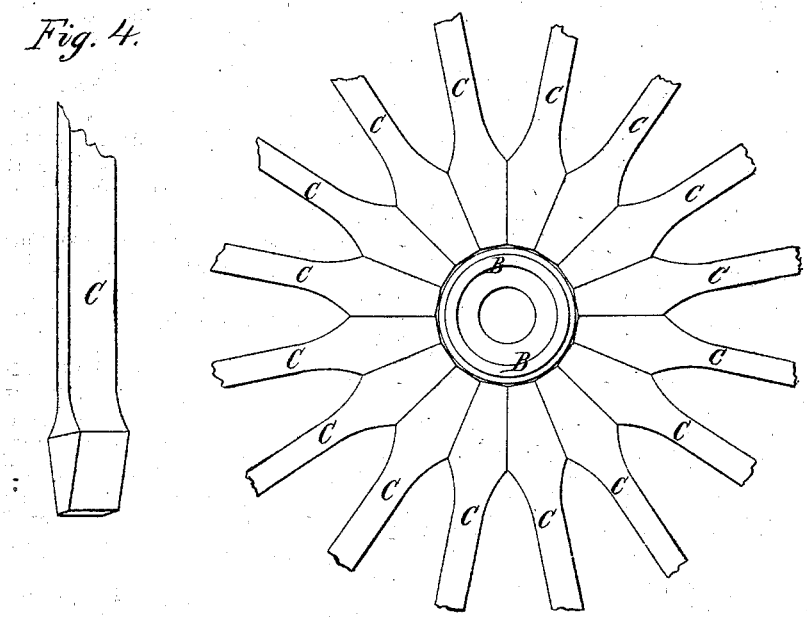
WITNESSES.
INVENTOR.

UNITED STATES PATENT OFFICE.

ALBERT L. BLACKMAN, OF CROSS PLAINS, TENNESSEE.

IMPROVEMENT IN WHEELS FOR VEHICLES.

Specification forming part of Letters Patent No. 135,623, dated February 11, 1873.

*To all whom it may concern:*

Be it known that I, ALBERT L. BLACKMAN, of Cross Plains, in the county of Robertson, State of Tennessee, have invented certain Improvements in Wheels for Vehicles; and I do hereby declare that the following is a full, clear, concise description of the same, reference being had to the accompanying drawing as forming a part of the specification.

My invention relates to certain improvements in the construction, arrangements, and conformation of the component parts of the wheel, more fully described and pointed out hereafter.

Figure 1 is a vertical section of the hub, showing the flanges or disks and the spokes in place, and the form of spokes one way. Fig. 2 is a perspective of the hub filled with spokes, showing the various parts. Fig. 3 is a front elevation of the hub filled with spokes. Fig. 4 is a perspective elevation of the spoke.

The hub consists of a hollow cylinder or cast tube, B, having a circular beveled or concave clamp, flange, or disk, E, cast with and on its inner or larger end. Against this disk or clamp the spokes are held by an adjustable beveled or concaved clamp or disk, A, that screws onto the cylinder B from the outward or nut end, forming, in combination with disk E, a formidable vise between which the spokes are placed, and when the flange or disk A is screwed home toward the center the spokes are firmly grasped.

By this arrangement and construction of a hub several important points are gained, among which are: The wheel can be made light without impairing its strength; it can be made quite straight, without dish; the spokes can be taken out and replaced without injury to the hub or rim; the tire can be tightened without cutting; the wheel can be taken down and repaired by the driver or any one on the highway, and without taking the hub from the axle.

The spokes C are dressed at their base 5 one way, wedge form or like the key-stone of an arch, and are placed side by side continuously around the cylinder B in the space *a* between the two disks, each spoke forming a key-stone in the arch, locking or binding one another. The base end of the spoke 3 is cut broader the other way—that is, extremely flaring, corresponding to the form of the space between the flanges or disks A and E—giving to the rim of the circle formed immediately around the cylinder B by the spokes a broad substantial base, which, when resting on cylinder B and screwed firmly in place by the disk A, overcomes the tendency of the wheel to dish, or this expanded base to the spoke forms a dovetail tenon having inclined sides corresponding to, though reversed from, those formed by the disks, upon which the disks may take hold, so that when the disk A is firmly screwed home toward the center the inclined surfaces of the disks, acting upon reversed similar inclined surfaces on the spokes, draw to the center; by means of these the spokes are drawn in and hugged down closer onto the hub-body. The expansion or contraction of the wheel is made at this point, and by the aid of these inclined surfaces and of the beveled disks or clamps.

By my improvement in vehicle wheels and hubs they can be made light, firm, and durable. My wheel can be repaired, the spokes be replaced, and the tire and spokes tightened at any place and by any one; the wheel can be taken down without taking the hub from the axle; the tire tightened without cutting; the hub refilled with spokes at will; or any spoke can be replaced without injury to the hub or rim, or disturbing the other spokes, or removing the tire or rim.

Having now described all that is essential to describe to have my invention clearly and fully understood, what I claim as my invention, and ask to have protected by Letters Patent, is—

1. Cast cylinder B in its peculiar construction, with the beveled or concave flange or disk E cast with it on its inner or larger end, in combination with the adjustable, beveled, or concaved flange or disk A, that screws on from the front or nut end of the hub, or their mechanical equivalents, the whole constructed and arranged substantially as and for the purposes set forth.

2. The spoke C, with its broad flaring end one way and wedge or key-stone shape the other, in combination with the cylinder B having the flange or disk E on its inner end, and the adjustable disk or flange A screwed on the outer end of cylinder B, or their mechanical equivalents, the whole constructed and arranged substantially as and for the purposes set forth.

ALBERT L. BLACKMAN.

Witnesses:
 F. J. BITTERLICH,
 F. M. CRAWFORD.